H. BARTHEL.
BALL BEARING.
APPLICATION FILED JULY 11, 1910.

990,203.

Patented Apr. 18, 1911.

Witnesses:
E. J. Williams
Chas. L. Grieshauer

Hermann Barthel
Inventor:
by Everett Dufour
atty

UNITED STATES PATENT OFFICE.

HERMANN BARTHEL, OF SCHWEINFURT, GERMANY.

BALL-BEARING.

990,203.

Specification of Letters Patent. Patented Apr. 18, 1911.

Application filed July 11, 1910. Serial No. 571,451.

*To all whom it may concern:*

Be it known that I, HERMANN BARTHEL, a subject of the King of Prussia, residing at No. 7 Petersgasse, Schweinfurt, Germany, have invented new and useful Improvements in Ball-Bearings, of which the following is a specification.

My invention relates to ball-bearings, and a primary object is to provide therefor an improved cage comprising two U-shaped rings placed back to back and in which apertures for receiving the balls are stamped. By means of this special construction of my ball cage various important advantages are obtained:—They can be made cheaply of sheet metal by stamping and pressing; the special cross-sectional shape of the rings assures great stability; small ruptured parts of balls can be removed readily from the bearing and all the balls are visible from the outside, so that when examining the bearings it can readily be ascertained whether they contain any defective balls; in spite of the great lightness of the rings the balls are inclosed both in a lateral and radial and also in a circular direction; the contact zones between the balls and the guide rings are very small, as the balls only lie against the narrow circular surfaces of the cage; and a face of double strength is formed in the central plane of the bearing, in which the cage is principally subjected to stresses, so that in spite of its great lightness the cage is capable of offering great resistance.

Some illustrative embodiments of my invention are represented by way of example in the accompanying drawing, wherein:—

Figure 1:
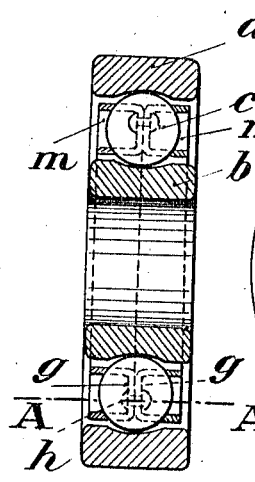
Figure 2:
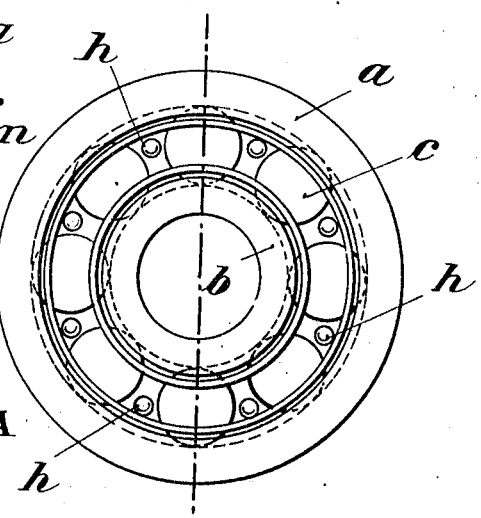
Figure 3:
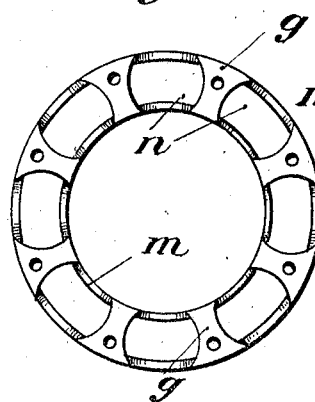
Figures 4, 5:
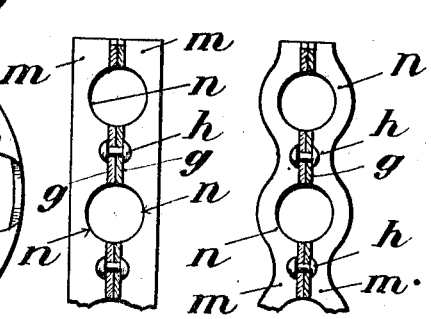

Figure 1 is a vertical section through a bearing, and Fig. 2 a side elevation of the same; Fig. 3 is an elevation of a ring forming one half of my cage as seen looking at the bottom of this ring; Fig. 4 is a development of a portion of the cage in section in the plane A—A in Fig. 1, and Fig. 5 illustrates a modified form of cage shown similarly.

Referring to the drawing, my improved cage made of sheet metal and having stamped apertures $n$ consists of two rings $m$, $m$ of U-shaped section; these are placed with their backs $g$, $g$ one against the other and connected together by rivets $h$ or the like. The two halves may be united after the balls $c$ have been placed between the ball races $a$, $b$ in a manner well-known in itself.

According to Fig. 4 the sides of the two rings fitted together forming the cage are plans and according to Fig. 5 wave-shaped, whereby the weight of the cage is still more decreased.

I claim:—

1. In a ball-bearing, the combination with a plurality of balls, of a cage comprising two rings of U-shaped section secured back to back and having apertures for receiving said balls.

2. A cage of the character described, comprising in combination two rings of U-shaped section secured back to back and having centrally-arranged apertures, the sides of said rings being wave-shaped, substantially as shown.

3. A device of the character described comprising a plurality of balls, duplicate U-shaped rings having their portions, answering to the bottom of the U, secured together, said bottom forming portions and the lateral portions of the U being produced with openings receiving or forming seats for said balls.

4. A device of the character described, comprising a plurality of balls, duplicate U-shaped rings having their portions answering to the bottom of the U secured together, said bottom forming portions and the lateral portions answering to the bottom of the U being produced with openings forming seats for said balls, and concentric members receiving between them said balls and said rings.

In witness whereof I have hereunto signed my name this 27th day of May, 1910, in the presence of two subscribing witnesses.

HERMANN BARTHEL.

Witnesses:
 HENRY HASPER,
 WOLDEMAR HAUPT.

---

Copies of this patent may be obtained for five cents each, by addressing the "Commissioner of Patents, Washington, D. C."